Nov. 12, 1968   D. S. DENCE   3,410,411
FILTER AND VALVE ASSEMBLY
Filed Sept. 30, 1966
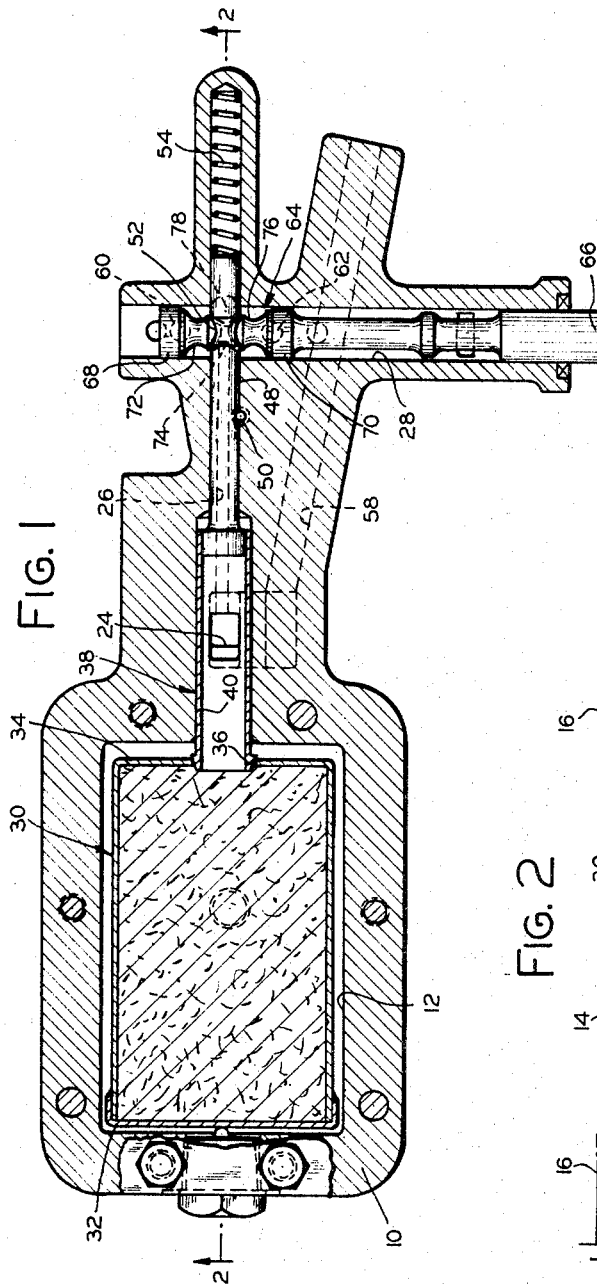
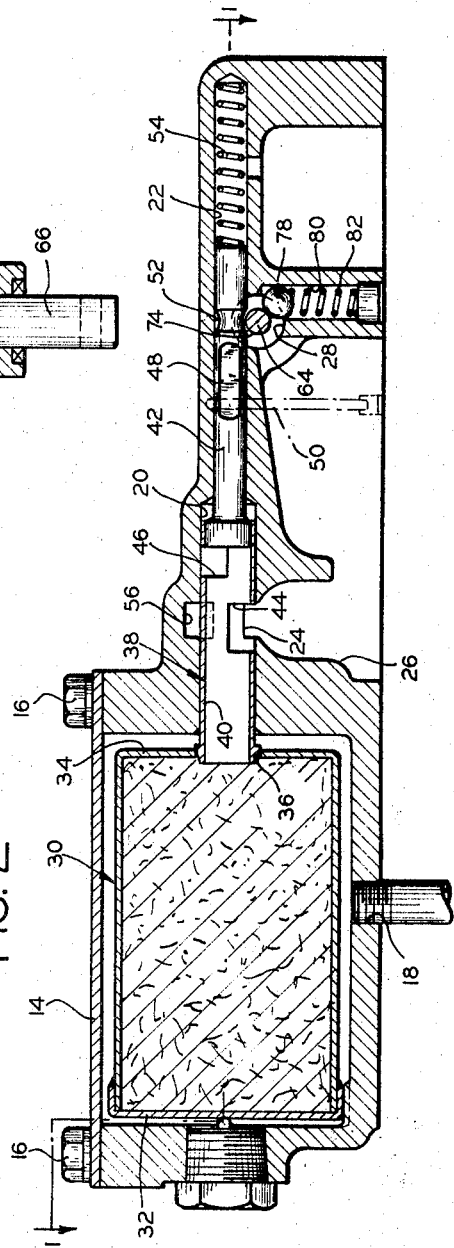
INVENTOR
DONALD S. DENCE
BY *Robert H. Johnson*
ATTORNEY

United States Patent Office 3,410,411
Patented Nov. 12, 1968

3,410,411
FILTER AND VALVE ASSEMBLY
Donald S. Dence, Brooklyn, Mich., assignor to Clark
Equipment Company, a corporation of Michigan
Filed Sept. 30, 1966, Ser. No. 583,275
2 Claims. (Cl. 210—100)

ABSTRACT OF THE DISCLOSURE

A filter and valve assembly hasing a first movable valve and a second movable valve which is interlocked with the first valve. Movement of the first valve is caused by fluid pressure on the filter and prevents movement of the second valve. This prevents operation of the fluid system when the filter becomes clogged.

---

In fluid systems it is general practice to provide filters in order to keep the fluid used in the system clean. If the fluid in the system becomes dirty, then there is undesirable wear on some system components. Also, various fluid passages, ports and the like may become clogged, resulting in malfunction of the system. All of this is, of course, undesirable, but frequently occurs because the filter provided in the system is not replaced with a new one as the old one becomes clogged with dirt.

Therefore, a principal object of my invention is to provide a filter and valve assembly which prevents operation of the fluid system when the filter becomes clogged.

In carrying out my invention in a preferred embodiment thereof, I provide a housing with a chamber therein. An inlet port communicates with the chamber and a bore extends outwardly from the chamber. A filter having an outlet port is disposed in the chamber. Slidably disposed in the bore is a valve spool which includes a fluid passage therein. Communicating with the bore is a first fluid port. The spool operates to communicate the fluid passage with the port in a first position or when shifted to a second position blocks fluid communication between the port and fluid passage. A spring disposed in the first bore biases the first spool toward the filter so that the end of the spool is in abutment with the filter and the fluid passage is in register with the filter outlet port. Also located in the housing is a second bore in which a second valve spool is disposed. Each valve spool includes a groove. The grooves cooperate so that when the first spool is in the first position the second spool is free to move along the second bore and when the first spool is moved away from the first position the second spool is blocked from movement along the second bore.

The above and other objects, features, and advantages of my invention will be more readily understood when the following detailed description is taken in conjunction with the accompanying drawing wherein:

FIGURE 1 is a sectional view of my invention taken along line 1—1 of FIGURE 2 and FIGURE 2 is a sectional view of my invention taken along line 2—2 of FIG. 1.

Referring now to the drawing, the reference numeral 10 denotes a housing which includes a chamber 12 that is closed by means of a removable cover 14 that is fastened to housing 10 by means of a plurality of machine screws 16. Communicating with chamber 12 is a fluid inlet port 18 and extending outwardly from chamber 12 is a bore 20 which has a reduced diameter portion 22.

Communicating with bore 20 at port 24 is a fluid passage 26 which communicates with another bore 28 in housing 10 which is disposed at substantially right angles to bore 20 and intersects the reduced diameter portion 22 of bore 20. Also communicating with bore 20 is a fluid port 56 which connects with a fluid passage 58.

Chamber 12 is adapted to receive a filter 30. Filter 30 is generally cylindrical in shape having a closed end 32 and an end 34 with an outlet port 36 therein. Filter 30 is made up of, at least in part, a porous material so that fluid may flow from the outside thereof to the interior thereof.

Slidably disposed in bore 20 is a valve spool 38 which includes a hollow cylindrical portion 40 which serves as a fluid passage and a reduced diameter rod portion 42 which is attached to one end of the cylindrical portion, preferably by welding. Cylindrical portion 40 includes openings 44 and 46 therein, disposed as shown. It will be noted that the end of the cylindrical portion 40 which extends into chamber 12 abuts filter 30 and registers with outlet port 36 in sealing engagement with the edges thereof. In the surface of rod portion 42 there is an elongated groove 48 which cooperates with a pin 50 in housing 10 to limit the extent of movement of spool 38 along bore 20. Also, there is an annular groove 52 in rod portion 42, disposed as shown. This groove cooperates with another groove, as will be explained shortly to provide interlocking means between spool 38 and another spool.

Spool 38 is biased toward the left, as viewed in FIGS. 1 and 2, by means of a compression spring 54 which is disposed in reduced diameter portion 22 or bore 20 between the end of the bore and the outer end of rod portion 42. The bias of spring 54 is sufficiently strong enough to maintain the outer end of cylindrical portion 40 of spool 38 in sealing relation with outlet port 36 of filter 30.

Communicating with bore 28 is a pair of ports 60 and 62. Fluid communication between fluid passage 26 which communicates with bore 28 and ports 60 and 62 is controlled by a valve spool 64 which is slidably disposed in bore 28 and includes a rod portion 66 which extends outwardly of housing 10 so that operator controlled actuating mechanism can be connected to it. Spool 64 also includes a pair of longitudinally spaced apart lands 68 and 70 and three annular grooves 72, 74 and 76 located between lands 68 and 70.

A detent ball 78 is disposed in a bore 80 and is biased by a spring 82 to engage annular grooves 72, 74 or 76 so as to maintain spool 64 in any one of three positions. Thus, annular grooves 72, 74 and 76 and ball 78 serve as detent means for spool 64. Also, annular grooves 72, 74 and 76 cooperate with annular groove 52 to serve as interlocking means between spools 38 and 64. That is, when spool 38 is in the position shown spool 64 may be shifted freely between its three detent positions, but if spool 38 is shifted in either direction away from the position shown, the annular groove 52 no longer provides the needed clearance to permit shifting of spool 64 along bore 28 so that now when it is attempted to shift spool 64 the groove which is positioned directly beneath rod portion 42 engages rod portion 42 and it is impossible to move spool 64 from one detent position to another.

When spool 64 is in the centered position shown fluid from passage 26 is in communication with both ports 60 and 62. Shifting spool 64 upwardly, as shown in FIG. 1, blocks fluid communication between passage 26 and port 62, so that passage 26 is in fluid communication only with port 60. On the other hand, downward shifting of spool 64, as shown in FIG. 1, blocks fluid communication between passage 26 and port 60 so that passage 26 is in fluid communication only with port 62.

In order to enable persons skilled in the art to better understand my invention, I will now explain the operation of it. It will be assumed that the filter and valve assembly is connected in the fluid circuitry of a hydrostatic drive so that pressurized fluid is being supplied to chamber 12 through inlet port 18, fluid passage 58 is connected to return fluid to the fluid reservoir, fluid passage 26 is connected to direct pressurized fluid to the main pump and controls for the hydrostatic drive and that ports 60 and 62 are connected via fluid passages to mechanism for conditioning the hydrostatic drive for forward or reverse drive.

With spool 64 in the position shown the hydrostatic drive will be in a neutral condition. By shifting spool 64 upwardly pressurized fluid from passage 26 will be directed only to port 60 so that the hydrostatic drive will be conditioned for forward drive. By shifting spool 64 downwardly pressurized fluid from passage 26 will be directed only to port 62 so that the hydrostatic drive will be conditioned for reverse drive.

Pressurized fluid supplied to chamber 12 through port 18 passes through the porous walls and ends of filter 30 and then flows through cylindrical portion 40 of spool 38 and hence into fluid passage 26 via opening 44 and port 24. Some of the pressurized fluid which is supplied to passage 26 is directed to the main pump and controls for the hydrostatic drive and part of the pressurized fluid is directed to bore 28. With spool 64 positioned as shown the hydrostatic drive is in a neutral condition and pressurized fluid is being supplied to both ports 60 and 62. If spool 64 is shifted upwardly, as viewed in FIG. 1, then fluid communication between passage 26 and port 62 is blocked. As a result the hydrostatic drive is conditioned for forward drive. On the other hand, if spool 64 is shifted downwardly, as viewed in FIG. 1, then fluid communication between passage 26 and port 60 is blocked so that the hydrostatic drive is conditioned for reverse drive.

Spool 38 and filter 30 are normally maintained in the position shown in FIGS. 1 and 2 due to bias of spring 54; however, since pressurized fluid is acting on both ends 32 and 34 of filter 30 and there is less area at end 34 due to part of end 34 being blocked by the end of cylindrical portion 40 of spool 38 there is a differential force exerted on filter 32 which tends to move filter 30 and spool 38 toward the right against the bias of spring 54. As filter 30 becomes clogged with dirt and other impurities that are being carried in the fluid the differential force being exerted on filter 30 and spool 38 increases because of the increased pressure of the fluid acting on the filter until it is greater than the force of spring 54 biasing them toward the left. When this occurs filter 30 and spool 38 will shift to the right, as viewed in FIGS. 1 and 2, so that annular groove 52 is no longer centered above spool 64. When this happens there is interference between rod portion 42 and one of the detent grooves 72, 74 and 76 so that spool 64 cannot be shifted along bore 28. When this occurs the operator will no longer be able to manipulate spool 64 to control the direction of the hydrostatic drive, and so the operator will be forced to perform the required maintenance, namely, replacing the clogged filter.

In the event that it is attempted to operate the hydrostatic drive or other associated circuit without filter 30, spring 54 will shift spool 38 toward the left until the end of groove 48 engages pin 50. With spool 38 in this position groove 52 is no longer centered over spool 64, and so rod portion 42 engages one of lands 72, 74 or 76 and prevents spool 64 from being shifted. Further, when spool 38 is in the left-most shifted position due to there being no filter in chamber 12 the openings 44 and 46 in cylindrical portion 40 are disposed so that fluid communication between bore 20 and fluid passage 26 is blocked and pressurized fluid being supplied by inlet port 18 is directed via cylindrical portion 40 through opening 46 to port 56 and via fluid passage 58 back to sump. This prevents any contaminated fluid from being directed to the working parts of the hydrostatic drive.

While the subject invention has been disclosed in conjunction for use with a hydrostatic drive and with a valve spool having three detent positions, it will be apparent that the application of my invention should not be so limited but could be used in any fluid circuit which requires a filter and includes a shiftable valve. Further, the valve could have any number of detent positions.

The above-detailed description is intended to be illustrative only, and should not be construed as limiting my invention since various modifications and changes to my invention which lie within the scope thereof may occur to other persons skilled in the art. Therefore, the limits of my invention should be determined from the following claims.

I claim:
1. A filter and valve assembly comprising a housing, a chamber in the said housing, a fluid inlet port communicating with said chamber, a first bore in the said housing which extends from the said chamber, a first port which communicates with the said first bore, a first valve spool including a fluid passage therein, the said spool being slidably disposed in the said first bore and movable between a first position in which fluid is directed from the said chamber to the said first port and a second position in which fluid communication between the said chamber and the said first port is blocked, means resiliently biasing the said first spool toward the said chamber, a second bore in the said housing, a second valve spool slidably disposed in the said second bore, means interlocking the said spools so that when the said first spool is in the said first position the said second spool is free to move along the said second bore and when the said first spool is moved away from the said first position the said second spool is locked against movement along the said second bore, and a filter disposed in the said chamber, the said filter having an outlet port therein and disposed to abut the said first spool with the said outlet port in register with the said fluid passage.

2. An assembly as set forth in claim 1 wherein the said bores intersect each other and the said interlocking means includes a groove in each of the said spools.

References Cited

UNITED STATES PATENTS

| | | | |
|---|---|---|---|
| 2,071,483 | 2/1937 | Winslow | 210—137 X |
| 2,366,112 | 12/1944 | Jokel | 210—106 |
| 2,632,566 | 3/1953 | Morrison | 210—100 |
| 3,280,980 | 10/1966 | King | 210—137 X |

REUBEN FRIEDMAN, *Primary Examiner.*

J. ADEE, *Assistant Examiner.*